Patented Nov. 13, 1951

2,574,984

UNITED STATES PATENT OFFICE 2,574,984

PREPARATION OF MIXED POLYVINYL ESTERS

Hyman Rudoff, Springfield, Mass., assignor to Shawinigan Resins Corporation, Springfield, Mass., a corporation of Massachusetts No Drawing. Application December 26, 1947, Serial No. 794,123

6 Claims. (Cl. 260—23)

This invention relates to mixed esters of polyvinyl alcohol.

It is known to prepare mixed esters of polyvinyl alcohol by copolymerizing two or more vinyl esters of carboxylic acids. However, there are certain difficulties involved in preparing mixed esters in this manner and it would be advantageous in certain instances to have another method for preparing such products.

It is an object of this invention to provide a new method for preparing mixed esters of polyvinyl alcohol. A further object is to provide a process for preparing mixed esters of polyvinyl alcohol directly from polyvinyl esters of carboxylic acids.

These and other objects are attained according to this invention by reacting polyvinyl esters of carboxylic acids with an acylating agent from the group consisting of anhydrides of carboxylic organic acids and acyl chlorides which are resistant to decomposition by alkali under conditions of the reaction, in the presence of an aqueous solution of an alkali metal hydroxide and a solvent.

The following examples are illustrative of the present invention but are not to be construed as limitative thereof. Where parts are mentioned, they are parts by weight.

Example I

A solution of 86 parts (1 molecular proportion) of polyvinyl acetate, 650 parts of dioxane and 70 parts (0.5 molecular proportion) of benzyl chloride is prepared. To this solution there are slowly added with vigorous agitation 40 parts (1 molecular proportion) of sodium hydroxide dissolved in an equal amount of water while maintaining the reaction mixture at about room temperature. The reaction mixture is then stirred at room temperature for about 15 hours. Water is added to the resulting product and thoroughly kneaded therewith. The product is then dissolved in ethanol, reprecipitated by the addition of water and separated from the liquid medium. After repeating the solution, reprecipitation and separation from the liquid medium, the product is dried by heating under vacuum at about 40° C., followed by heating at 120° C. at atmospheric pressure. As a result of this treatment, about 80 parts of an amber-colored product is obtained. Analysis of this product shows that it contains 15% benzoate groups by weight, calculated as polyvinyl benzoate, 0% polyvinyl alcohol, and the balance substantially polyvinyl acetate. It is found that this mixed ester of polyvinyl alcohol may be easily molded under heating and pressure into light-colored, flexible, transparent sheets.

Example II

Example I is repeated except that the reaction mixture is agitated at about 30° C. for 48 hours. The resulting product purified in the same manner as the product in Example I is found to contain 22.4% benzoate groups by weight, calculated as polyvinyl benzoate, 0% polyvinyl alcohol and the balance substantially polyvinyl acetate. This product, like the product of Example I, is easily molded under heating and pressure into light-colored, transparent, flexible sheets.

Example III

Example I is repeated except that the reaction mixture is agitated in a dough-type mixer at 30–45° C. for about three hours. In this case the product is purified by successively dissolving the product in ethanol and then precipitating the product with isopropyl ether. The mixed ester which results is found to contain 12.6% benzoate groups, calculated as polyvinyl benzoate, the balance substantially polyvinyl acetate and to be substantially free from hydroxyl groups.

From the foregoing examples, which are illustrative of the present invention, it can readily be seen that the present invention provides an unexpectedly valuable method for preparing mixed esters of polyvinyl alcohol. For example, it is to be noted that it is not necessary to hydrolyze the polyvinyl ester in a separate step but by means of the one step of the invention, acetate or other ester groups are directly replaced with ester groups of a different nature.

Numerous variations may be introduced in the process of the invention as exemplified by the examples. Thus, in place of polyvinyl acetate other polymers of vinyl esters of carboxylic acids may be used, as for example, polyvinyl formate, polyvinyl propionate, polyvinyl butyrate, polyvinyl valerate, polyvinyl hexoate and other polyvinyl esters in which the acyl groups are derived from organic acids, e. g., the acyl groups of the acylating agents set forth below. A preferred group of polyvinyl esters is that in which the acyl group is derived from a lower aliphatic acid, i. e., an aliphatic acid containing 1–6 carbon atoms such as those mentioned above.

The polyvinyl acetate used in the examples is characterized by such a degree of polymerization as to have a viscosity of about 20 centipoises in a 1-molar benzene solution at 20° C. Polyvinyl acetates exhibiting other viscosity characteristics may be used, e. g., viscosities of 5–500 or more centipoises in 1-molar benzene solutions at 20° C. Other polyvinyl esters may have corresponding degrees of polymerization.

As indicated hereinbefore, the acylating agent may be either an acid anhydride or an acyl chloride. However, in the case of acyl chlorides care must be used to employ an acyl chloride which is resistant to decomposition by the alkali under the conditions of the reaction. For this reason, the lower aliphatic acyl chlorides are not suitable for the purpose of the invention. However, higher aliphatic acyl chlorides, i. e., those which contain 10 or more carbon atoms may be used as well as aromatic acid chlorides. Examples of acid chlorides which may be used include the chlorides of the following acids: decanoic acid, dodecanoic acid, hexadecanoic acid, octadecanoic acid, eicosanoic acid, phthalic acid, benzoic acid, toluic acids, diphenic acid, o-benzylbenzoic acid, naphthoic acids, naphthalene dicarboxylic acids and the like as well as substitution products such as those mentioned below in the case of the anhydrides. When desired, mixtures of these and/or other acid chlorides may be used.

The following are examples of anhydrides which may be used as acylating agents in the process of the invention: aliphatic anhydrides, such as acetic anhydride, propionic anhydride, butyric anhydride, valeric anhydride, hexanoic anhydride, heptanoic anhydride, octanoic anhydride, nonanoic anhydride, decanoic anhydride, dodecanoic anhydride, hexadecanoic anhydride, octadecanoic anhydride, eicosanoic anhydride, aromatic acid anhydrides such as phthalic anhydride, benzoic anhydride, toluic anhydride, phenyl acetic anhydride, phenyl propionic anhydride, phenyl butyric anhydride, diphenic anhydride, o-benzyl benzoic anhydride, naphthoic anhydride, naphthalene dicarboxylic acid anhydrides, and the like as well as substitution products thereof, e. g., halo, i. e., chloro, bromo or fluoro derivatives, alkyl, i. e., methyl, ethyl, propyl, butyl, pentyl, hexyl derivatives and the like. Mixed anhydrides may be used when desired based on any combination of the above or other anhydrides. Also mixtures of these and/or other anhydrides may be used.

In place of sodium hydroxide other alkali metal hydroxides may be used in the process of the invention, as for example, potassium hydroxide, cesium hydroxide and rubidium hydroxide.

In place of dioxane other liquids may be employed which are solvents for both the initial polyvinyl ester and the mixed ester prepared therefrom. Examples of other suitable solvents include: benzene, toluene, xylene, etc.

The temperature at which the reaction is conducted may be substantially varied. However, it is usually preferred that temperatures of not over 60° be employed to avoid undesirable side reaction. The duration of the reaction is governed by the relative proportions of the ingredients employed and the results desired. Thus, under certain circumstances it may be desirable to continue the reaction until equilibrium is established while under other circumstances it may be preferred to employ an excess of the acylating agent and stop the reaction when the desired degree of replacement of ester groups has occurred.

The relative proportions of polyvinyl ester, acylating agent and alkali metal hydroxide may be substantially varied. Usually, it is found desirable to employ a substantial excess of acylating agent in order to promote a rapid reaction. For example, up to a 200–500% excess of the acylating agent based on the desired degree of ester replacement is found to be advantageous.

Sufficient alkali metal hydroxide should be used to be equivalent to twice the desired degree of ester replacement. Larger amounts may be used, for example, up to a 200–500% excess over the above amount.

The concentration of the aqueous solution of the alkali metal hydroxide may be substantially varied. For example, a 5–60% solution may be used.

The amount of solvent which is used may be substantially varied. Preferably, the amount used is sufficient to keep the reactants and the products in solution throughout the reaction. An excessive amount is usually avoided for economic reasons.

As indicated above, the extent of the reaction may be substantially varied by variation in the reaction conditions and duration. While replacement of as little as 1% of the acyl groups of the polyvinyl esters by other acyl groups may be effective to alter materially the characteristics thereof and is intended to be covered by the present invention, usually it is found that the more valuable products do not contain less than 5% (based on total acyl group content) of any particular acyl group. Thus, while it is contemplated that the process of the invention may be used to replace 1–99% of the acyl groups of a polyvinyl ester with other acyl groups, usually the degree of replacement is 5–95%.

It is obvious that many variations may be made in the processes and products of this invention without departing from the spirit and scope thereof as defined in the appended claims.

What is claimed is:

1. A process which comprises reacting a homopolymer of a vinyl ester of an unsubstituted aliphatic monocarboxylic acid having 1–6 carbon atoms with an acylating agent having only carboxyl functional groups and an acyl group different from the acyl group of the polyvinyl ester, the acylating agent being a member of the group consisting of aromatic carboxylic acid chlorides, aliphatic carboxylic acid chlorides containing more than 9 but less than 21 carbon atoms, and organic carboxylic acid anhydrides, in the presence of an aqueous solution of an alkali metal hydroxide of from 5% to 60% concentration and an inert organic solvent for the vinyl ester, and continuing said reaction until a mixed ester of polyvinyl alcohol is formed in which from 1% to 99% of the initial ester groups have been replaced with the ester groups from the acylating agent, said mixed ester being free from polyvinyl alcohol groups.

2. A process as defined in claim 1 in which the acylating agent is an organic carboxylic acid anhydride.

3. A process as defined in claim 2 in which the anhydride is an aromatic acid anhydride.

4. A process as defined in claim 1 in which the acid chloride is an aliphatic carboxylic acid chloride containing more than 9 but less than 21 carbon atoms.

5. A process for preparing a mixed ester of polyvinyl alcohol which comprises reacting polyvinyl acetate with benzoyl chloride in the presence of an aqueous solution of sodium hydroxide of 5% to 60% concentration and dioxane until 1% to 99% of the acetate groups are replaced with benzoate groups, said mixed ester being free from polyvinyl alcohol groups.

6. A process as defined in claim 5 in which the reaction is continued until 5% to 95% of the acetate groups are replaced by benzoate groups.

HYMAN RUDOFF.

REFERENCES CITED

The following references are of record in the file of this patent:

UNITED STATES PATENTS

| Number | Name | Date |
|---|---|---|
| 2,145,345 | Dreyfus | Jan. 31, 1939 |
| 2,269,187 | D'Alelio | Jan. 6, 1942 |

FOREIGN PATENTS

| Number | Country | Date |
|---|---|---|
| 396,186 | Great Britain | Aug. 3, 1933 |

OTHER REFERENCES

Weygand: Organic Preparations, Interscience, 1945, pp. 180, 181.